United States Patent [19]

Sprang et al.

[11] Patent Number: 5,516,083
[45] Date of Patent: May 14, 1996

[54] SLEEVE RUBBER SPRING FOR MOUNTS IN A MOTOR VEHICLE

[75] Inventors: Rüdiger Sprang, Lahnstein; Andreas Vossel, Osnabrück; Frank Meyering, Lohne, all of Germany

[73] Assignee: Lemförder Metallwaren AG, Bremen, Germany

[21] Appl. No.: 310,424

[22] Filed: Sep. 22, 1994

[30] Foreign Application Priority Data

Sep. 23, 1993 [DE] Germany .................. 43 32 367.7

[51] Int. Cl.⁶ .................. F16M 5/00; F16F 13/00
[52] U.S. Cl. .................. 267/140.12; 248/562
[58] Field of Search .................. 267/35, 64.19, 267/64.23, 64.27, 140.11, 140.12, 141.3, 141.6, 217, 219, 220, 293; 248/562, 636; 180/300, 312

[56] References Cited

U.S. PATENT DOCUMENTS

| 5,092,565 | 3/1992 | Hamaekers et al. | 267/140.12 |
| 5,118,087 | 6/1992 | Jordens et al. | 248/562 X |

FOREIGN PATENT DOCUMENTS

| 335007 | 10/1989 | European Pat. Off. | 267/140.12 |
| 418671 | 3/1991 | European Pat. Off. | 267/140.12 |
| 2841505C2 | 4/1983 | Germany . | |
| 4020713C2 | 10/1991 | Germany . | |
| 4216648 | 11/1992 | Germany | 267/140.12 |
| 4233705 | 4/1994 | Germany | 267/140.12 |

*Primary Examiner*—David M. Mitchell
*Assistant Examiner*—Peter M. Poon
*Attorney, Agent, or Firm*—McGlew and Tuttle

[57] ABSTRACT

A sleeve rubber spring for mounts in a motor vehicle, in which a rubber body is arranged between an inner tube and an outer tube and has at least two chambers, which are filled with a fluid damping agent and are connected to one another through at least one overflow channel. A shutoff structure is provided including an axially extending seal, which opens only in the case of a predetermined pressure difference in the chambers. This seal of the shutoff structure of the overflow channel includes at least two sealing lips, which are separated from one another, have a hook-type profile in their cross section with a radial undercut and are deformable radially to the central axis of the sleeve rubber spring.

15 Claims, 2 Drawing Sheets

SLEEVE RUBBER SPRING FOR MOUNTS IN A MOTOR VEHICLE

FIELD OF THE INVENTION

The present invention pertains to a sleeve rubber spring for mounts in a motor vehicle in which a rubber body is arranged between an inner tube and an outer tube and at least two chambers are provided, which are filled with a fluid dampening agent and are connected to one another through an overflow channel with a shutoff formed of an axially extending seal, opening only in the case of a predetermined pressure difference between the chambers.

BACKGROUND OF THE INVENTION

This basic structure of a sleeve rubber spring has been known from DE 40 20 713. According to this disclosure the shutoff means in the overflow channel is formed by a rubber strip on the rubber body, which rubber strip is in loose contact with a radially deformable countersurface of the outer tube, wherein the extent of these deformations is determined by the displacement of the vibrations that occur. In the case of a sudden spring deflection and the resulting abrupt increase in the internal pressure in one of the chambers, this deformation makes it possible for fluid to flow over from that chamber into the other chamber. On the other hand, the throttling losses in the throttling channel increase to such an extent that fluid is no longer displaced through the throttling channel, so that the chamber walls may be inflated and possibly burst, so that the sleeve rubber spring is destroyed. The elasticity of the shutoff means in the overflow channel is usually designed to be such that it opens at a predetermined chamber internal pressure.

Instead of a deformable outer tube, an elastic overflow lip in the overflow channel between the two chambers has been known from DE 28 41 505 C2. However, depending on the amplitude and the frequency of the vibration, an opening cross section of varying size is formed in such overflow lips. This results in an additional overflow channel with an opening cross section of a more or less uncontrolled size for the dynamic function of the sleeve rubber spring, as a result of which the required dynamic properties of the sleeve rubber spring are considerably influenced.

SUMMARY AND OBJECTS OF THE INVENTION

The object of the present invention is to design the shutoff means of the overflow channel such that unintended shifts of the damping maximum and consequently of the dynamic rigidity of the sleeve rubber spring are avoided, especially in the case of greater spring deflections.

According to the invention, a sleeve rubber spring for mounts in a motor vehicle is provided including an inner tube, an outer tube and a rubber body arranged between the inner tube and the outer tube. Two chambers are defined adjacent the rubber body and each of the chambers are filled with a fluid dampening agent. An overflow channel is defined for connecting the chambers to one another. The overflow channel includes a shutoff means formed of an axially extending seal opening, the shutoff being activated in the case of a predetermined pressure difference between the chambers. The seal of the shutoff means is designed or formed of at least two sealing lips which are separated from one another and have a hook-type profile in cross section, with a radial undercut. The sealing lips are deformable radially toward a central axis of the sleeve rubber spring.

The invention further preferably provides a continuously open throttle channel formed in the rubber body.

These design features make it possible to design the shutoff means of the overflow channels for the controlled opening of the overflow channel during an increase in pressure, so that the sealing lips of the overflow channel remain closed under a low pressure in the fluid chamber, and a predeterminable opening of the overflow channel takes place under a higher pressure, so that fluid will be displaced from one chamber into the other. The opening cross section now formed in the overflow channel is in agreement with the overall dynamic tuning of the mount with the throttling channel.

At least two sealing lips with possibly different profiles are preferably provided in the shutoff means of the overflow channel. The hook-type profiles of the sealing lips may be directed in the same direction or in opposite directions. Different rigidities of the sealing lips may possibly be achieved not only by different profiling, but also by means of materials of different elasticity. In a special embodiment of the present invention, one overflow channel or a plurality of overflow channels are arranged both on the side of the throttling channel and on the diametrically opposed side.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
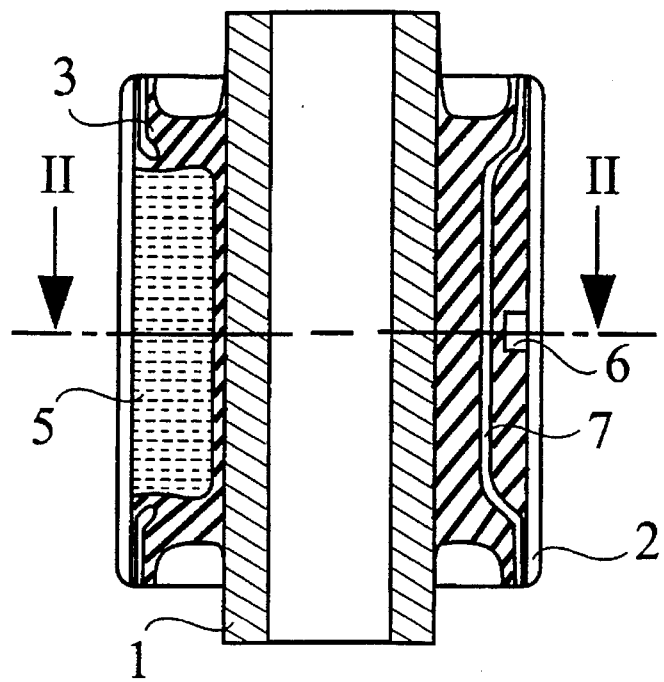
FIG. 1 is a sectional view along line I—I in FIG. 2.
Figure 2:
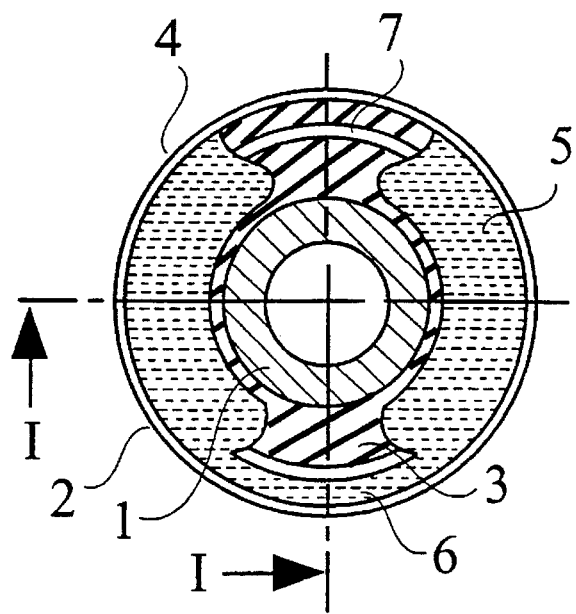
FIG. 2 is a sectional view along line II—II in FIG. 1.
Figure 3:
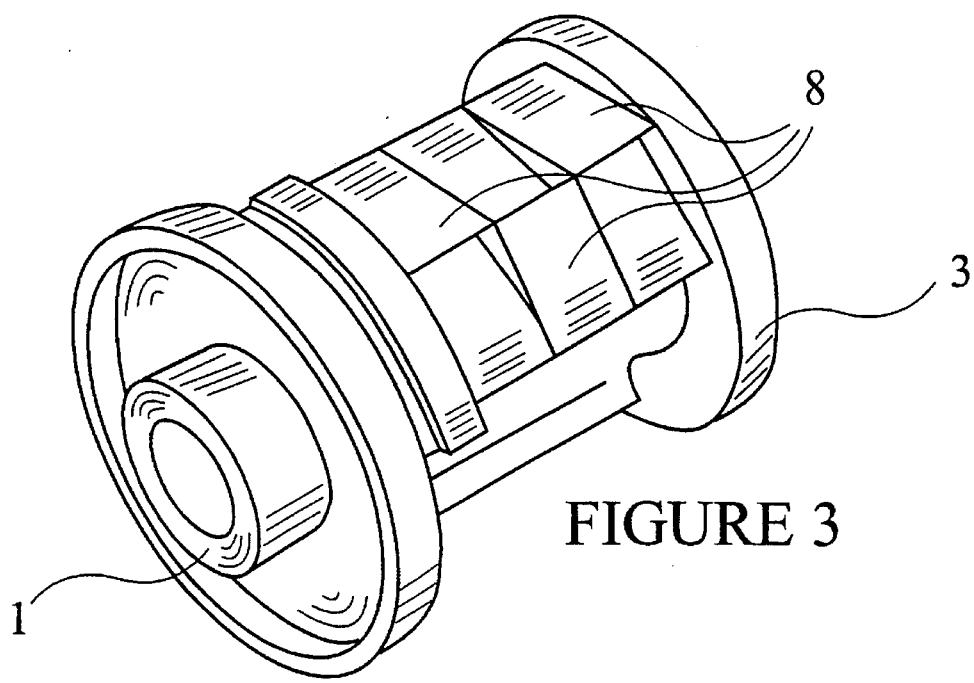
FIG. 3 is a perspective view of the rubber body on a larger scale.
Figure 4:
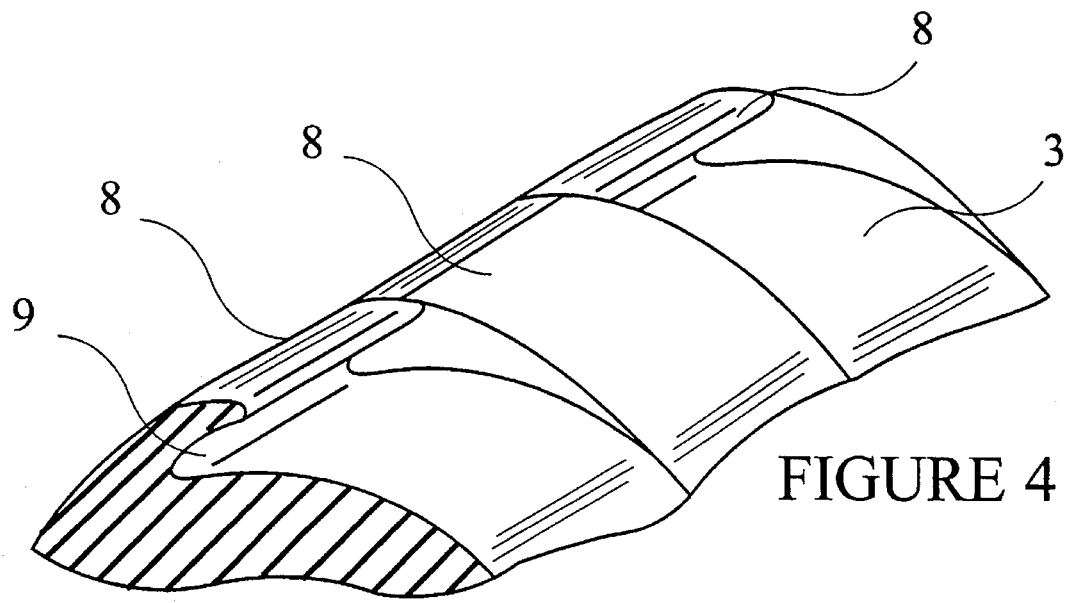
FIG. 4 is a partial view of the design of the sealing lip on a scale even larger than that of FIG. 3.

The sleeve rubber spring according to the exemplary embodiment is formed of an inner tube 1, an outer tube 2, and a rubber body 3 located between them. Two chambers 4 and 5 are filled with a hydraulic damping fluid and are connected to one another by a throttling channel 6. The two chambers 4 and 5 are provided in the rubber body 3. An intermediate sleeve 7, which has openings in the area of the fluid-filled chambers 4 and 5 and encloses the throttling channel 6 between it and the outer tube 2, is embedded in the radially outer area of the rubber body 3. The material of the rubber body 3 also extends between the intermediate sleeve 7 and the outer tube 2, both of which are connected to the rubber body 3 in a non-positive manner. Furthermore, at least one overflow channel with a shutoff means comprising sealing lips 8, which are represented on a larger scale in FIGS. 3 and 4, is provided between the two fluid-filled chambers 4 and 5. The sealing lips 8, forming the shutoff means of the overflow channel have a cross section in a radial plane with a hook-type profile. This hook-type profile is formed by a radial undercut 9. The sealing lip 8, formed by the hook-type profile and the undercut 9, is in contact with the inner surface of the outer tube 2. In the case of an increase in the internal pressure in one of the chambers 4 or 5, the sealing lip becomes detached from the inner surface of the outer tube, and it releases a predeterminable, additional cross section for pressure equalization between the two chambers 4 and 5. To fine tune the dynamic properties of the sleeve rubber spring, a plurality of sealing lips, which are separated from one another and have different profiles and different rigidities are arranged, and they act correspondingly. In the embodiment according to the graphic representation, the geometry of the sealing lips 8 consists of two sealing lips, which are separated from one another and are consequently elastic per se, and which may be arranged directed in the same direction or in opposite directions. As shown in FIG. 4, the sealing lips 8 are preferably also formed of rubber and integrally formed with the rubber body 3 to form a single homogeneous unit. Due to the undercut of the sealing lips 8 in the radial direction, the sealing lips 8 are deformable toward the central axis of the component. To achieve controlled opening of the shutoff means in the overflow channel during an increase in pressure, the ratio of the thickness, length and shape of the undercut 9 of the sealing lip 8 should be selected to be such that the sealing lips will remain closed under a low pressure, and the damping fluid will be displaced from one chamber into the other only through the throttling channel 6. Under higher internal pressure, the sealing lips open in a controlled manner, corresponding to the selected tuning, and the opening cross section thus formed is harmonically integrated into the overall tuning of the sleeve rubber spring with the throttling channel.

What is claimed is:

1. A sleeve rubber spring for mounts in a motor vehicle, comprising:

an inner tube;

an outer tube;

a rubber body arranged between said inner tube and said outer tube, said rubber body cooperating with said outer tube to define at least two chambers, each of said chambers being filled with a fluid damping agent, said rubber body and said outer tube cooperating to define an overflow channel;

shutoff means including an axially extending seal for opening only in a case of a predetermined pressure difference between said two chambers, said seal being formed of at least two rubber sealing lips which are separated from one another and are integrally formed with said rubber body, each of said sealing lips having a radial undercut and having a hook-type profile in cross section, each of said sealing lips being deformable radially toward a central axis of the sleeve rubber spring.

2. A sleeve rubber spring according to claim 1, further comprising a throttle channel defined between said two chambers, said throttle channel being continuously open providing communication between said two chambers.

3. A sleeve rubber spring according to claim 2, wherein said sealing lips are provided with hook-type profiles arranged pointing in opposite directions.

4. A sleeve rubber spring according to claim 2, wherein said sealing lips each have different profiles and are designed with different rigidities.

5. A sleeve rubber spring according to claim 2, wherein said overflow channel is arranged on a side of said rubber body opposite said throttle channel.

6. A sleeve rubber spring according to claim 2, wherein overflow channels are arranged on a side of said rubber body opposite said throttle channel and on a side of said rubber body adjacent said throttle channel.

7. A sleeve rubber spring according to claim 1, wherein said sealing lips are provided with hook-type profiles arranged pointing in opposite directions.

8. A sleeve rubber spring according to claim 7, wherein said sealing lips each have different profiles and are designed with different rigidities.

9. A sleeve rubber spring according to claim 1, wherein said sealing lips each have different profiles and are designed with different rigidities.

10. A sleeve rubber spring comprising:

an inner tube;

an outer tube;

an integral rubber body arranged between said inner tube and said outer tube, said rubber body cooperating with said outer tube to define two chambers, each of said chambers being filled with a fluid damping agent, said rubber body and said outer tube cooperating to define an overflow channel;

shutoff means positioned in said overflow channel for opening and closing communication between said two chambers when a predetermined pressure difference exists between said two chambers, said seal being formed of two sealing lips formed of rubber and integral with said rubber body, said sealing lips are separated from one another and have a hook-type profile in cross section, each of said sealing lips being formed by a radial undercut in said rubber body, each of said sealing lips being deformable radially toward a central axis of the sleeve rubber spring.

11. A sleeve rubber spring in accordance with claim 10, wherein:

said rubber body defining said overflow, and said two sealing lips form a single homogeneous unit.

12. A sleeve rubber spring in accordance with claim 10, wherein:

said rubber body defines a single overflow channel;

said two sealing lips are positioned in said single overflow channel and are arranged in opposite circumferential directions.

13. A sleeve rubber spring in accordance with claim 10, wherein:

said rubber body defines a throttle channel between said two chambers, said throttle channel being positioned on an opposite radial side of said rubber body from said overflow channel.

14. A sleeve rubber spring in accordance with claim 13, wherein:

said rubber body defines another overflow channel between said two chambers, said another overflow channel being positioned on a side of said rubber body adjacent said throttle channel.

15. A sleeve rubber spring in accordance with claim 10, wherein:

said shutoff means includes a plurality of sealing lips orientated in a same direction, one of said plurality of sealing lips has a profile and rigidity different from another one of said plurality of sealing lips.

* * * * *